United States Patent
Lebreton et al.

(10) Patent No.: US 6,932,391 B2
(45) Date of Patent: Aug. 23, 2005

(54) QUICK-RELEASE FITTING ASSEMBLY

(75) Inventors: Edward T. Lebreton, Mentor, OH (US); George S. Ellis, Chardon, OH (US)

(73) Assignee: Essef Corporation, Chardon, OH (US)

( * ) Notice: Subject to any disclaimer, the term of this patent is extended or adjusted under 35 U.S.C. 154(b) by 0 days.

(21) Appl. No.: 10/358,476

(22) Filed: Feb. 5, 2003

(65) Prior Publication Data

US 2003/0168854 A1 Sep. 11, 2003

Related U.S. Application Data

(60) Provisional application No. 60/357,334, filed on Feb. 15, 2002.

(51) Int. Cl.⁷ ............................................. F16L 27/00
(52) U.S. Cl. ..................... 285/321; 285/277; 285/280; 285/281
(58) Field of Search ................................ 285/321, 276, 285/277, 278, 280, 281

(56) References Cited

U.S. PATENT DOCUMENTS

| | | | | |
|---|---|---|---|---|
| 2,299,643 A | * | 10/1942 | Moody | 285/321 |
| 2,440,452 A | * | 4/1948 | Smith | 285/321 |
| 3,817,560 A | * | 6/1974 | Guertin | 285/277 |
| 3,924,882 A | | 12/1975 | Ellis | |
| 4,240,654 A | * | 12/1980 | Gladieux | 285/276 |
| 4,621,840 A | * | 11/1986 | Foster | 285/321 |
| 4,783,100 A | * | 11/1988 | Klein | 285/276 |
| 4,804,206 A | * | 2/1989 | Wood et al. | 285/276 |
| 4,832,378 A | * | 5/1989 | Zepp | 285/321 |
| 4,884,829 A | * | 12/1989 | Funk et al. | 285/321 |
| 4,926,895 A | * | 5/1990 | Gailey | 137/15.09 |
| 5,219,190 A | * | 6/1993 | Grammel, Jr. | 285/276 |
| 5,584,411 A | | 12/1996 | Channell et al. | |
| 5,699,930 A | | 12/1997 | Channell et al. | |
| 5,718,459 A | * | 2/1998 | Davie et al. | 285/321 |
| 5,845,944 A | * | 12/1998 | Enger et al. | 285/276 |
| 5,890,750 A | | 4/1999 | Channell et al. | |

FOREIGN PATENT DOCUMENTS

| | | | | |
|---|---|---|---|---|
| EP | 0 287 446 A1 | | 10/1988 | |
| EP | 287446 | * | 10/1988 | 285/321 |
| EP | 1 072 381 A1 | | 1/2001 | |
| GB | 1097192 | | 12/1967 | |
| JP | 560281 | * | 9/1993 | 285/321 |

* cited by examiner

*Primary Examiner*—David Bochna
(74) *Attorney, Agent, or Firm*—Pearne & Gordon LLP

(57) ABSTRACT

A quick-release fitting assembly has a male fitting and a female fitting. The male and female fittings are secured together by a retaining ring that is at least partially received in aligned first and second retaining grooves that are provided in the male fitting and the throat of the female fitting respectively. A water tight seal is provided by an O-ring that is retained in a sealing groove of the male fitting and radially compressed against the throat wall when the male fitting is inserted in the female fitting. The water tight seal remains substantially intact when the male fitting is rotated relative to the female fitting. In a preferred embodiment, the male fitting is removable from the female fitting by first compressing the retaining ring so that it no longer extends into the second retaining groove. In this embodiment, a locking ledge may be provided in the first retaining groove which prevents the retaining ring from being compressed when the fitting is under pressure so that the male fitting cannot be removed from the female fitting under pressure.

24 Claims, 4 Drawing Sheets

QUICK-RELEASE FITTING ASSEMBLY

This application claims the benefit of U.S. Provisional Patent Application Ser. No. 60/357,334 filed Feb. 15, 2002.

BACKGROUND OF THE INVENTION

1. Field of the Invention

The invention relates to a quick-release fitting assembly, and more particularly to a water tight quick release fitting assembly for use in water treatment systems or apparatus.

2. Description of Related Art

Water tanks and other pressure vessels are well known components of water treatment systems. In a given system, the vessel is connected to other equipment by a fitting that provides fluid communication between the interior of the vessel and the remainder of the system. Typically, the fitting is a threaded fitting that is screwed onto or into a throat or opening of the vessel having complimentary threads. In this manner, a well known screw-tight seal is achieved between the fitting and the vessel, with the fitting providing fluid communication between the vessel's interior and the remainder of the system; e.g. a valve or pipe on the other side of the fitting.

This type of fitting connection has at least two major drawbacks. First, a significant amount of work and specialized tools are required to install screw-type threaded fittings into pressure vessels to ensure water tightness. This presents a problem especially for installation of pressure vessels for, e.g., water softening systems, in cramped or tight spaces. It is generally desirable to install new equipment (e.g. a new pressure vessel) in-place within a water treatment system, and to disturb the remainder of the system as little as possible. Unfortunately, often there is not enough space in residential (or industrial) water treatment applications to properly install a new or replacement pressure vessel in-place to an existing fitting. This is in part because the fitting, already a part of the system, must remain stationary and the vessel itself must be rotated to mate the fitting and achieve water tightness. This operation is extremely cumbersome and difficult in a cramped space, and can be impossible for certain vessels having non-circular cross-sections.

Second, for threaded fittings it is very difficult to predict the final rotational orientation between the fitting itself and the vessel to which it will be secured. In the case of metal-to-metal fittings, it is nearly impossible to design or predict the final rotational orientation that will achieve a water tight seal without over-tightening. This has presented a problem in the past because pressure vessels often have specific shapes to accommodate particular applications, and often these vessels must mate with piping or instrumentation in a fixed spatial relationship to the vessel itself. Therefore, it can be critically important that a fitting maintain a water tight seal with the vessel on the one hand, and provide properly oriented connections to mate with downstream piping or instrumentation on the other.

There is a need in the art for a water tight fitting suitable for water treatment systems that is capable of quick and easy installation without disturbing the remainder of the system. Preferably, such a fitting will provide a water tight seal, and still allows the tank or vessel to be oriented in any rotational position with respect to the remainder of the system. Most preferably, such a fitting will allow rotation of the vessel in-place without compromising the water tight seal.

SUMMARY OF THE INVENTION

A fitting assembly is provided having a male fitting, a female fitting, a retaining ring and an O-ring. The male fitting has a cylindrical portion and a plurality of axially spaced, radially extending annular portions extending from the cylindrical portion. A first pair of the radially extending annular portions define a first retaining groove therebetween, and a second pair of the radially extending annular portions define a sealing groove therebetween. The first retaining groove is adapted to receive the retaining ring therein and the sealing groove is adapted to receive the O-ring therein. The female fitting has a throat that has a throat wall with a second retaining groove disposed in the throat wall. The second retaining groove divides the throat wall into an upper wall portion and a lower wall portion. The throat of the female fitting is adapted to receive and accommodate the male fitting therein such that a) the first retaining groove of the male fitting is aligned with the second retaining groove in the throat wall, b) the retaining ring is at least partially retained in each of the first and second retaining grooves, and c) the O-ring is radially compressed against the throat wall to provide a water tight seal.

A fitting assembly is also provided having a male fitting, a female fitting, a stiffly flexible rod and an O-ring. The male fitting has a cylindrical portion and a plurality of axially spaced, radially extending annular portions extending from the cylindrical portion. A first pair of the radially extending annular portions definine a first retaining groove therebetween, and a second pair of the radially extending annular portions define a sealing groove therebetween. The first retaining groove is adapted to receive the stiffly flexible rod therein and the sealing groove is adapted to receive the O-ring therein. The female fitting has a throat having a throat wall and a second retaining groove disposed in the throat wall. The throat wall has a retaining port therethrough that is tangentially aligned with the second retaining groove in the throat wall.

Another fitting assembly is also provided having a male fitting, a female fitting, a metal retaining ring and an O-ring. The male fitting has a cylindrical portion and a plurality of axially spaced, radially extending annular portions extending from the cylindrical portion. A first pair of the radially extending annular portions define a first retaining groove therebetween, and a second pair of the radially extending annular portions define a sealing groove therebetween. The first retaining groove is adapted to receive the retaining ring therein and the sealing groove is adapted to receive the O-ring therein. The female fitting has a metal rim portion and a throat having a throat wall. A portion of the throat wall is a metal surface provided by the metal rim portion, and a further portion of the throat wall is a plastic surface. A second retaining groove is disposed in the metal surface of the throat wall. The second retaining groove divides the throat wall into an upper wall portion and a lower wall portion.

DETAILED DESCRIPTION OF THE INVENTION

Unless otherwise specified herein, all components and members of the invented fitting assembly are made via known or conventional means from conventional materials.

Figure 1:
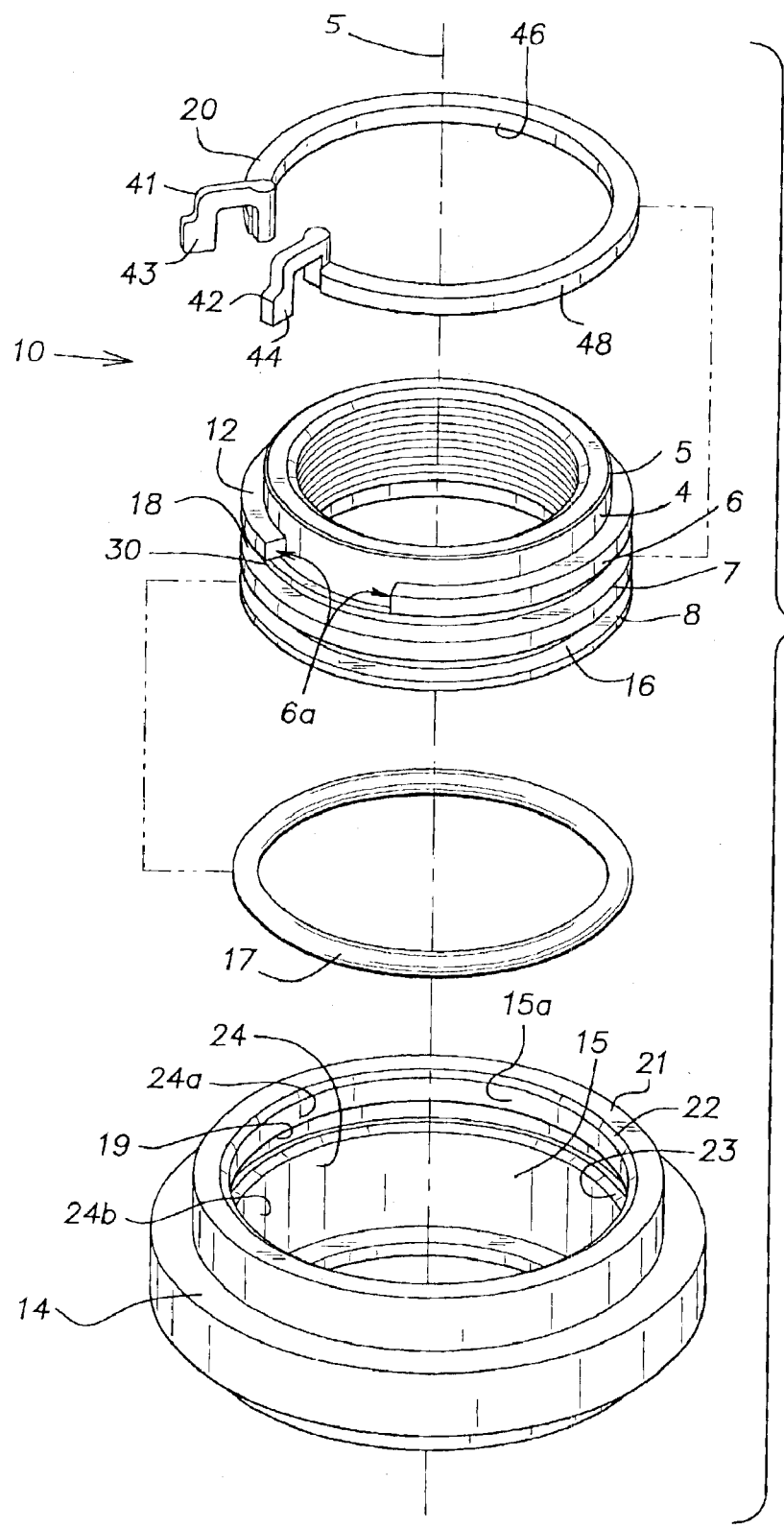
FIG. 1 is an exploded perspective view of the fitting assembly according to a first embodiment of the invention.
Figure 2:
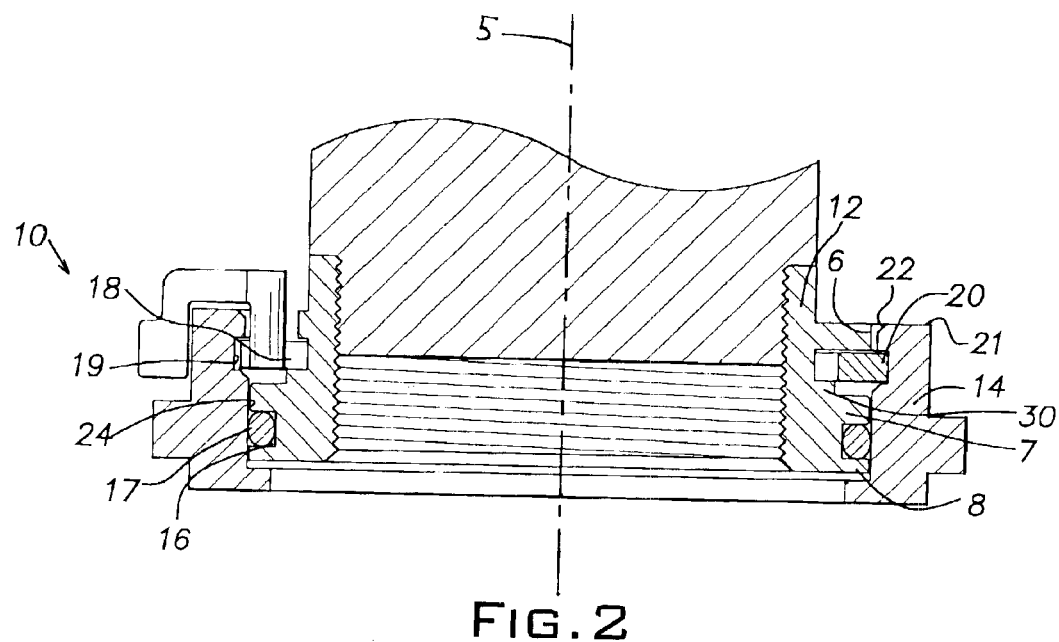
FIG. 2 is a side cross-sectional view of the fitting assembly of FIG. 1 shown in an assembled, depressurized condition.
Figure 3:
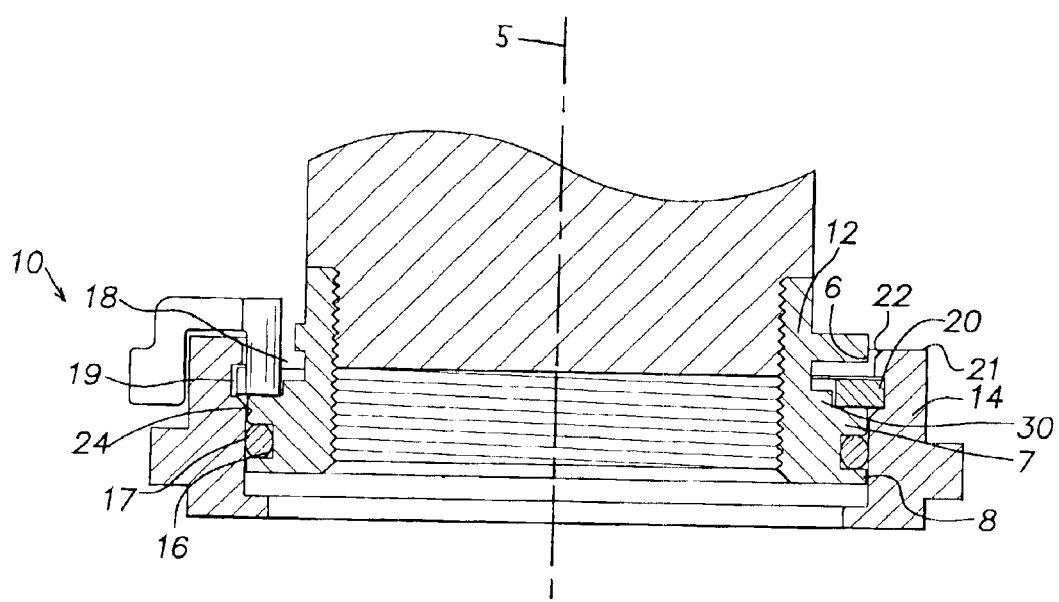
FIG. 3 is the same view shown in FIG. 2, except that the fitting assembly is shown in a pressurized condition.

FIGS. 1–3 show a quick-release fitting assembly 10. Referring first to FIG. 1, FIG. 1 shows the fitting assembly 10 in an exploded view that has been exploded axially along the assembly's longitudinal axis 5. The fitting assembly 10 has a male fitting 12 and a female fitting 14. The male fitting 12 is preferably made from plastic, such as polypropylene, polyethylene or PVC, or any other suitable plastic or thermoplastic material, including polymeric and fluoropolymeric materials. (Fluoropolymeric materials such as Teflon are less preferred for high pressure conditions because they are relatively soft and tend to flow under pressure. However, fluoropolymers can be used, e.g. for low pressure applications where chemical compatibility is of major concern). The fitting 12 can be made from metal, e.g. aluminum, copper, brass, steel, etc.

The male fitting 12 is a generally cylindrical fitting having a cylindrical portion 5 and a plurality of axially spaced, radially extending annular portions such as first, second and third radially extending annular portions 6, 7 and 8 respectively extending from an outer circumferential surface 4 of the cylindrical portion 5.

The extending annular portions 6 and 7 define a first retaining groove 18 therebetween. The first retaining groove 18 is adapted to receive a retaining ring 20 therein, and is deep enough to accommodate the retaining ring 20 in both a locked position and unlocked position as explained further below. As best seen in FIG. 1, the first extending annular portion 6 of the male fitting 12 has a gap 6a about the outer circumferential surface 4 of the cylindrical portion 5. The gap 6a is to accommodate first and second overhang portions 41 and 42 of the retaining ring 20, as will be further described. Within groove 18, the interfaces or intersections between annular portions 6 and 7 and the outer circumferential surface 4 of the cylindrical portion 5 are square, meaning that annular portions 6 and 7 and the surface 4 meet at right angles. Such an arrangement provides a groove 18 having a generally rectangular cross-section. However, one or both intersections can be rounded, curved or chamfered.

The retaining ring 20 is a generally circular member having an inner diameter 46 and an outer diameter 48. The ring 20 is discontinuous and has first and second overhang portions 41 and 42 with tabs 43 and 44 disposed at either terminus thereof. The retaining ring 20 is advantageously made from a stiffly flexible material, such as a thermoplastic material. By stiffly flexible material, it is meant that the diameter of the retaining ring 20 can be expanded and contracted by the application of an external force, and will spontaneously return to its unflexed diameter once the external force is removed. By unflexed diameter, it is meant the diameter of the ring 20 when no external force is applied to expand or contract the retaining ring 20; i.e. the ring 20 is at rest. The retaining ring 20 can be expanded and contracted, for example, by opening and closing respectively the distance between the tabs 43 and 44. It will be understood that at its unflexed diameter, the retaining ring 20 has a corresponding unflexed inner diameter and unflexed outer diameter, respective to inner and outer diameters 46 and 48. Stiffly flexible materials can include metals in addition to plastics.

A circular locking ledge 30 is provided within the first retaining groove 18 on the male fitting 12. The locking ledge 30 is disposed circumferentially about the cylindrical portion 5 within groove 18 adjacent the second extending annular portion 7. The locking ledge 30 is disposed at the intersection between the surface 4 and annular portion 7 as shown in FIGS. 1–3.

The extending annular portions 7 and 8 define a sealing groove 16 therebetween. Within the groove 16, the interfaces or intersections between annular portions 7 and 8 and the surface 4 are similarly fashioned as described above with respect to groove 18. The sealing groove 16 is adapted to receive an O-ring 17 therein. The sealing groove 16 is deep enough to securely retain the O-ring 17, with a portion of the O-ring 17 extending radially outside the groove 16 as will be further described. The O-ring 17 is made from an elastomeric or rubber material. Suitable elastomeric materials include polytetrafluoroethylene elastomers including Teflon, Viton, Kalrez and Zalak elastomers (all registered trademarks of DuPont), neoprene rubbers, polyisoprenes, polybutadienes, polyisobutylenes, polyurethanes, EPDM, and natural rubber. Alternatively, any other suitable elastomeric or rubber material can be used for the O-ring 17, so long as the material selected is compatible with the wetting fluid; i.e. the fluid for which the fitting assembly 10 is used.

The female fitting 14 is made from the same or similar materials as the male fitting 12. The female fitting 14 is also a generally cylindrical fitting, and has a throat 15 to accommodate the male fitting 12 therein. A circumferential lip 21 defines an opening 15a of the throat 15. The lip 21 preferably has a first chamfered edge 22. The throat 15 also has a throat wall 24, and a second retaining groove 19 disposed within the throat wall 24. The groove 19 separates an upper portion 24a from a lower portion 24b of the throat wall 24. The lower edge of the retaining groove 19 adjacent lower portion 24b is preferably a second chamfered edge 23. The second retaining groove 19 has a rectangular cross-section similar to the first retaining groove 18 described above. Also, the diameter of upper portion 24a is slightly larger than that of lower portion 24b. This is to allow easier translation of the O-ring 17 past the upper portion 24a each time the male fitting 12 is inserted or removed from the female fitting 14 as below described.

The male fitting 12 is inserted into throat 15 of the female fitting 14 to establish a sealed fitting connection as will now be described. First the retaining ring 20 and O-ring 17 are assembled onto the male fitting 12 as generally shown in FIG. 1. The retaining ring 20 is assembled to the male fitting 12 as follows. First, the tabs 43 and 44 are separated by known means (e.g. by applying pressure with one's fingers, or other mechanical device) to expand the retaining ring 20. The tabs 43 and 44 are separated until the inner diameter 46 of the retaining ring 20 is large enough to slide the ring 20 over the first extending annular portion 6 from the top of the male fitting 12. When sliding the retaining ring 20 over the fitting 12, the tabs 43 and 44 are aligned with the gap 6a of annular portion 6 so that the overhang portions 41 and 42 of the retaining ring 20 are disposed within the gap 6a once the retaining ring is seated within the first retaining groove 18. After the retaining ring 20 has cleared the first annular portion 6, the pressure applied to the tabs 43 and 44 is released, and the locking ring returns to its unflexed diameter and is seated or retained within the first retaining groove 18. The unflexed inner diameter 46 of the retaining ring 20 is larger than the diameter of the outer circumferential surface 4 of the cylindrical portion 5; i.e. at its unflexed diameter the retaining ring 20 is retained loosely within the first retaining groove 18, such that by bringing the tabs 43 and 44 together the retaining ring 20 is compressed so as not to protrude from the groove 18, and is substantially completely contained therein. The O-ring 17 is then seated in the sealing groove 16. Once seated, the O-ring 17 partially protrudes or extends radially outside of the groove 16.

The male fitting 12 (having the retaining ring 20 and O-ring 17) is inserted into the throat 15 of the female fitting 14 as follows. Pressure is applied to the tabs 43 and 44 so that the retaining ring 20 does not protrude outside of the first retaining groove 18. Next, the male fitting 12 is inserted into the throat 15 with the tabs 43 and 44 still compressed so as not to inhibit insertion of the male fitting. Once the first retaining groove 18 has cleared the opening 15*a* of throat 15, the pressure on the tabs 43 and 44 is released and the male fitting 12 is pressed further into the throat 15. As the male fitting 12 is inserted further into the throat 15, the first retaining groove 18 is brought into alignment with the second retaining groove 19 in the female fitting 14. Insertion proceeds until the retaining grooves 18 and 19 are aligned, and the retaining ring 20 spontaneously expands into the second retaining groove 19 to return to its unflexed diameter. At its unflexed diameter, the retaining ring 20 is partially positioned in each of the retaining grooves 18 and 19, thereby fixing the male fitting 12 in place within the female fitting 14.

During insertion, the first and second chamfered edges 22 and 23 advantageously help minimize damage to the radially extending O-ring 17. The O-ring 17 is guided by the first chamfered edge 22, translating past the upper portion 24*a* of the throat wall, and is subsequently guided by the second chamfered edge 23 into position against the lower portion 24*b* of the throat wall. The diameter of lower portion 24*b*, and the thickness and physical (compressional/elastic) properties of the O-ring 17 are selected so that the O-ring is radially compressed between the lower portion 24*b* and the surface 4 of the cylindrical portion 5 at the base of the retaining groove 16 to form a water tight seal. It will be apparent from the above description and from the figures that once the male and female fittings are fixed in place, the water tight seal formed between the lower portion 24*b*, the O-ring 17 and the surface 4 at the base of the groove 16 is independent of the rotational orientation of the male and female fittings 12 and 14. In other words, the male fitting 12 can be rotated within the female fitting 14 without breaking or substantially compromising the water tight seal.

Referring to FIG. 2, the fitting assembly 10 is shown with the male fitting 12 fixed in place within the female fitting 14. As seen in FIG. 2, the resting inner diameter 46 of the retaining ring 20 is large enough to accommodate the locking ledge 30 therein. When the fitting is not pressurized from a working fluid, the locking ring 20 can be compressed into the first retaining groove 18 above the locking ledge 30 and the male fitting 12 can be removed. This is referred to as the unlocked position because the locking ring 20 is free to be compressed into the first retaining groove 18 (so it no longer extends into the second retaining groove 19) to permit removal of the male fitting 12 from the female fitting 14. However, when the fitting is pressurized from the working fluid, the male fitting 12 is pressed upward as a result of internal pressure and the locking ledge 30 becomes seated within the inner diameter 46 of the retaining ring 20. (See FIG. 3). In this position, referred to as the locked position, the locking ledge 30 prevents the retaining ring 20 from being compressed and the male fitting is locked into the female fitting; i.e. the male fitting 12 cannot be removed. Thus, the locking ledge 30 provides a safeguard against accidental compression of the retaining ring 20 when the fitting is pressurized. Also, the locking ledge 30 prevents an operator who is not aware the fitting is pressurized from removing the male fitting 12, thereby greatly reducing the risk of injury and equipment damage.

Figure 4:
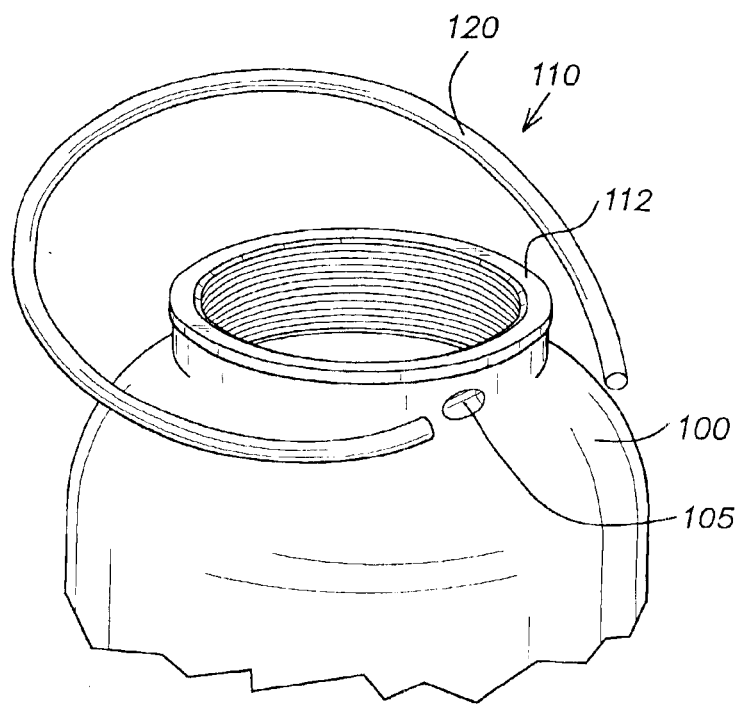
FIG. 4 is a perspective view of a tank utilizing the fitting assembly according to a second embodiment of the invention.
Figure 5:
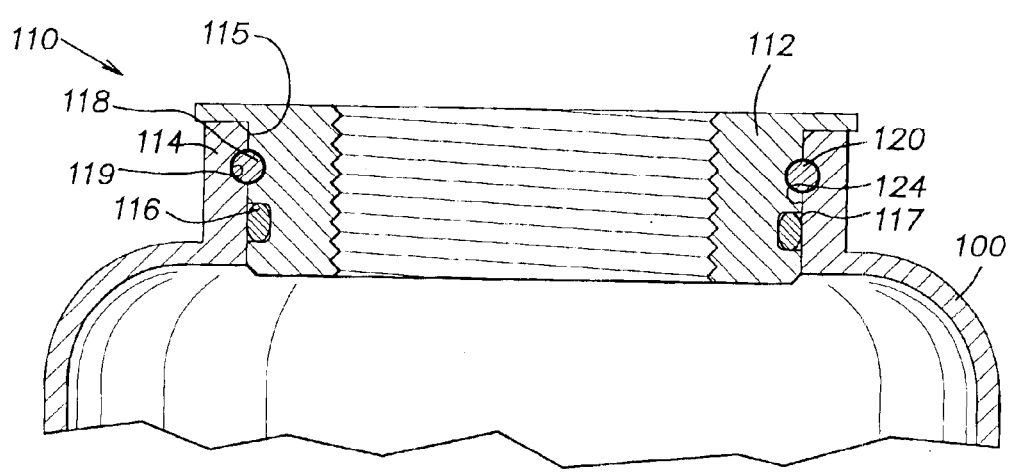
FIG. 5 is a side cross-sectional view of the tank of FIG. 4 with the fitting assembly being in an assembled condition.

FIGS. 4 and 5 show a fitting assembly 110 according to a second embodiment of the invention. In FIGS. 4 and 5, members or elements corresponding to analogous members or elements from the first embodiment of FIGS. 1–3 are indicated by like reference numerals plus 100, (e.g. the male fitting 12 functionally corresponds to male fitting 112). Referring to FIG. 5, a female fitting 114 is shown molded into or as part of a water tank or vessel 100 to form an integral part thereof. This is one embodiment. In another embodiment, the female fitting 114 can be a stand-alone fitting adapted to mate to a stand-alone vessel or other piping or equipment known in the art, e.g. via a threaded connection or other conventional connection. Likewise, the male fitting 112, as well as the male and female fittings 12 and 14 from FIGS. 1–3, can be a stand-alone fitting as shown, or alternatively it can be molded into, or as part of, a vessel, pipe or other equipment known in the art to form an integral part thereof. It will be understood that when stand-alone fittings are used, these fittings can have threaded connections for being permanently connected to fixtures such as tanks, vessels, pipes, and other operational units (which are units or machines that perform some function in a water or fluid system, including distillation columns, absorbers, adsorbers, scrubbers, reactors, heat exchangers, flowmeters, valves, digesters, ovens, etc.).

Returning to the figures, FIGS. 4 and 5 show the fitting assembly 110 with the male fitting 112 fixed into a throat 115 of the female fitting 114 to form a water tight sealed connection. A sealing groove 116, an O-ring 117 and a throat wall 124 are all provided substantially similarly as in the first embodiment described above. A first retaining groove 118 and a second retaining groove 119 are also similarly provided in the male and female fittings 112 and 114 respectively. In addition to the second retaining groove 119, the female fitting 114 is also provided with a retaining port 105 through the throat wall 124. The port 105 is tangential to the groove 119. To provide a sealed fitting connection in this embodiment, the O-ring 117 is seated in the sealing groove 116 and the male fitting is inserted into the throat 124 of the female fitting 114. A stiffly flexible retaining rod 120 is then inserted into the port 105 which is now tangentially aligned with the retaining passage formed by the opposing first and second retaining grooves 118 and 119 as seen in FIG. 5. Once in place, the retaining rod 120 prevents removal of the male fitting 112 because it is partially retained in both the first and second retaining grooves 118 and 119 as is shown in FIG. 5. Similarly as in the first embodiment, the O-ring 117 is compressed between the throat wall 124 and the base of the retaining groove 116 to form a water tight seal, and the retaining rod 120 fixes the male and female fittings 112 and 114 in place. The male fitting 112 can be rotated relative to the female fitting 114 without breaking or substantially compromising the water tight seal formed between the O-ring 117 and the throat wall 124.

Figure 6:
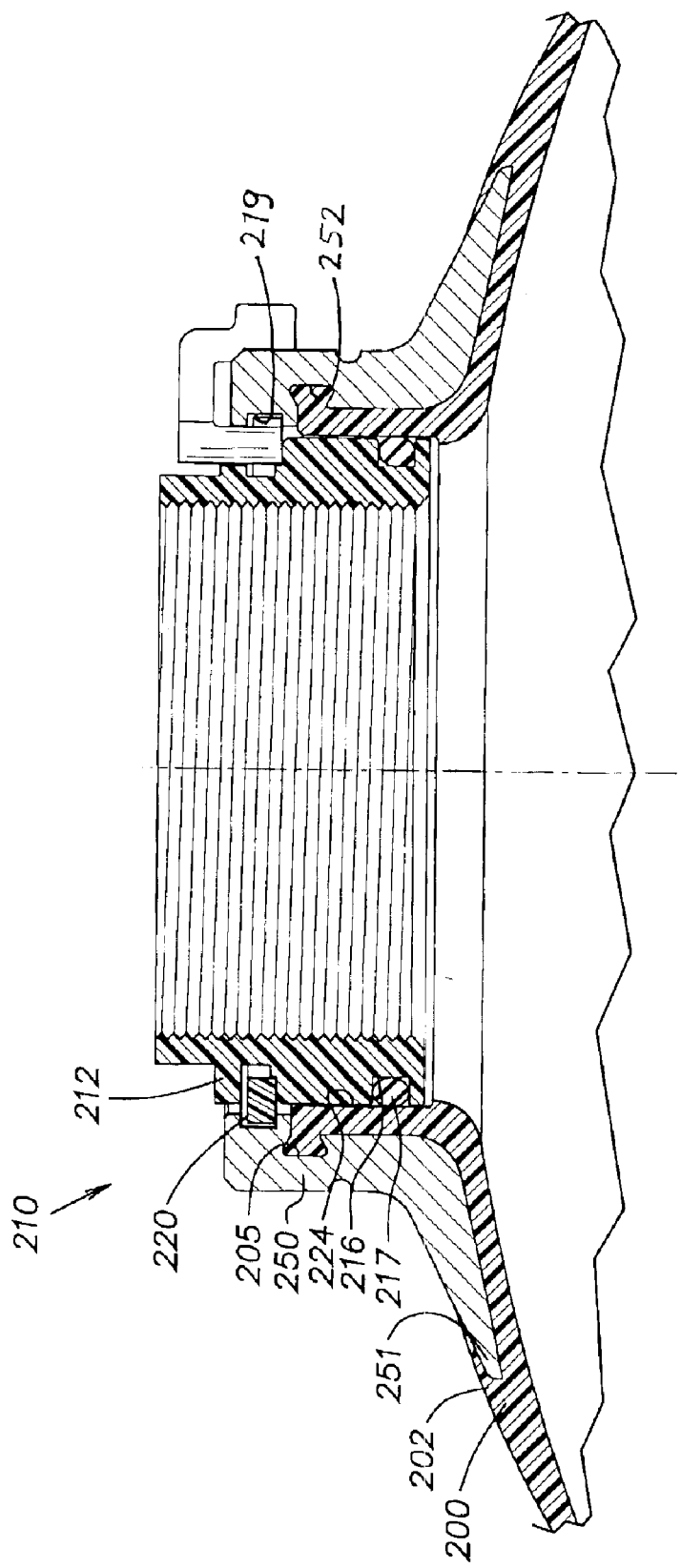
FIG. 6 is a side cross-sectional view of a tank utilizing the fitting assembly according to a third embodiment of the invention.

FIG. 6 shows a fitting assembly 210 according to a third embodiment of the invention. This embodiment is preferred where ASME standards require pressurized fittings (for pressure vessels) to be fixed in place by metal components. In FIG. 6, members or elements corresponding to analogous members or elements from the first embodiment of FIGS. 1–3 are indicated by like reference numerals plus 200, (e.g. male fitting 12 functionally corresponds to male fitting 212).

As seen in the figure, this embodiment is substantially similar to the first embodiment of FIGS. 1–3, except that a metal rim portion 250 has been provided to contain the second retaining groove 219. The metal rim portion 250 is preferably provided as an integral part of a vessel 200 by a known or conventional method. In one method, the metal rim portion 250 is first cast by a conventional casting method, and then placed as an insert in a blow mold or rotational mold. Then the vessel is blow molded or rotationally molded around the metal rim portion 250, such that the metal rim portion 250 becomes an integral part of the finished molded vessel 200. Methods of blow molding and rotationally molding are conventional in the art.

The metal rim portion 250 is cast or formed with a trapezoidal groove 252, or some other retentive shape. By retentive shape, it is meant that the groove has a cross-section which, because of its geometry, is effective to physically retain plastic material from the vessel 200 that is pressed therein during the molding process and then cured or set. Also, the outer wall of the vessel 200 is molded around and over an outer circumferential rim 251 of the metal rim portion 250 thus providing a slot 202 in the shoulder of the vessel 200 to retain the rim 251. In this manner, the metal rim portion 250 is securely and permanently constrained in place as an integral part of the vessel 200. Subsequently, the vessel can be resin coated and/or filament wound as known in the art.

In this embodiment a throat wall 224 that forms the sealing surface for the O-ring 217 is a plastic surface; i.e. the metal rim portion 250 is lined with plastic about its inner diameter as shown in FIG. 6. Also, in this embodiment the male fitting 212 and retaining ring 220 are made from metal. In this manner, all wetted surfaces are made from plastic and all elements for fixing the male and female fittings in place are made from metal in accord with ASME standards. The fitting assembly 210 of this embodiment is otherwise made and used substantially similarly as described above with respect to the first embodiment shown in FIGS. 1–3.

From the foregoing, it will be apparent that a quick release fitting assembly can be quickly connected and disconnected without the use of specialized tools. Such a fitting assembly is especially useful for making separable, but still water tight connections in confined spaces where conventional threaded fittings would be difficult to connect or disconnect. In addition, a quick release fitting assembly allows the male and female fittings (and therefore equipment to which they are respectively attached) to be rotationally oriented in any position along a full 360° arc relative to one another while still maintaining a water tight seal. In other words, the water tight seal remains substantially intact and is independent of the relative rotational orientation between the male fitting 12,112,212 and the female fitting 14,114,214. In one embodiment, the fitting assembly is designed to prevent accidental or unwitting disconnection of the fitting assembly while pressurized. This reduces the risk of operator injury as well as equipment damage or failure. The fitting assembly has the further advantage that it can be repeatedly reused, (i.e. the male and female fittings connected and disconnected) without substantially compromising the water tight integrity of the system. This is because the O-ring 17,117,217 of the fitting assembly can be quickly and easily replaced in-situ without removing the fittings and without substantially impacting the remainder of the system. Conversely, once threaded sealing connections in conventional threaded fittings are worn or stripped, they must be replaced. Replacement of conventional fittings is time consuming and expensive, and can contribute to significant down time.

The fitting assembly has been described assuming liquid water to be the working fluid. However, the fitting assembly can also be used with other working fluids, such as acids, bases, organic and inorganic chemicals, etc., in liquid, gaseous, or saturated states. In this event, it will be understood that certain modifications may be desirable to accommodate alternative working fluids. Such modifications are well known or conventional in the art; e.g. the materials of construction can be adapted for compatibility with the working fluid. It will be understood that the term "water tight" as used herein includes fluid- or gas-tightness for other fluids or gases should another fluid or gas be the working fluid instead of liquid water.

Although the hereinabove described embodiments of the invention constitute the embodiments, it should be understood that modifications can be made thereto without departing from the scope of the invention as set forth in the appended claims.

What is claimed is:

1. A fitting assembly comprising a male fitting, a female fitting, a retaining ring and an O-ring, said male fitting comprising a cylindrical portion and a plurality of axially spaced, radially extending annular portions extending from said cylindrical portion, a first pair of said radially extending annular portions defining a first retaining groove therebetween, a second pair of said radially extending annular portions defining a sealing groove therebetween, said first retaining groove adapted to receive said retaining ring therein and said sealing groove adapted to receive said O-ring therein, said female fitting comprising a throat having a throat wall and a second retaining groove disposed in said throat wall, said second retaining groove dividing said throat wall into an upper wall portion and a lower wall portion, said male fitting further comprising a locking ledge disposed circumferentially about said cylindrical portion thereof within said first retaining groove, said retaining ring having a resting inner diameter large enough to accommodate said locking ledge therein, wherein said retaining ring, said locking ledge, and said first and second retaining grooves are adapted to provide said retaining ring in a locked position when said fitting assembly is pressurized, such that said locking ledge is seated within said inner diameter of said retaining ring thereby preventing said retaining ring from being compressed completely within said first retaining groove, thereby preventing removal of said male fitting from said female fitting in a pressurized condition of said fitting assembly, said fitting assembly further comprising means to compress said retaining ring into said first retaining groove when said retaining ring is in an unlocked position, thereby permitting removal of said male fitting from said female fitting in an unpressurized condition of said fitting assembly.

2. A fitting assembly according to claim 1, said throat of said female fitting being adapted to receive and accommodate said male fitting therein such that a) said first retaining groove of said male fitting is aligned with said second retaining groove in said throat wall, b) said retaining ring is at least partially retained in each of said first and said second retaining grooves, and c) said O-ring is radially compressed against said throat wall to provide a water tight seal.

3. A fitting assembly according to claim 2, further adapted such that said O-ring is radially compressed against said lower wall portion of said throat wall to provide said water tight seal when said male fitting is received in said female fitting.

4. A fitting assembly according to claim 1, said male fitting comprising three of said radially extending annular portions, being first, second and third radially extending annular portions respectively, said first retaining groove being defined between said first and said second radially extending annular portions, said sealing groove being defined between said second and said third radially extending annular portions.

5. A fitting assembly according to claim 1, one of said extending annular portions being discontinuous, having a gap about an outer circumferential surface of said cylindrical portion of said male fitting.

6. A fitting assembly according to claim 1, said female fitting further comprising a circumferential lip defining an opening of said throat in said female fitting, said circumferential lip having a chamfered edge.

7. A fitting assembly according to claim 1, said lower wall portion of said throat wall having a circumferential edge adjacent said second retaining groove in said throat wall, said circumferential edge of said lower wall portion being a chamfered edge.

8. A fitting assembly according to claim 1, said upper wall portion having a larger diameter than said lower wall portion.

9. A fitting assembly according to claim 1, said locking ledge being provided adjacent an intersection of said cylindrical portion with one of said extending annular portions.

10. A fitting assembly according to claim 1, said male fitting being received within said female fitting, said first retaining groove being aligned with said second retaining groove, said retaining ring being at least partially retained in each of said first and said second retaining grooves, said O-ring being retained within said sealing groove and being radially compressed against said throat wall to provide a water tight seal, said retaining ring, said locking ledge, and said first and second retaining grooves cooperating to provide said retaining ring in said locked position when said fitting assembly is pressurized.

11. A fitting assembly according to claim 1, said O-ring being radially compressed against said lower wall portion of said throat wall.

12. A fitting assembly according to claim 1, said male fitting being rotatable within said female fitting without substantially compromising said water tight seal.

13. A fitting assembly according to claim 1, said retaining ring being substantially circular and discontinuous, and having a first overhang portion disposed at a first terminus thereof, and a second overhang portion disposed at a second terminus thereof.

14. A fitting assembly according to claim 13, one of said extending annular portions of said male fitting being a first extending annular portion and being discontinuous, having a gap about an outer circumferential surface of said cylindrical portion, said gap in said first extending annular portion being adapted to accommodate said first and said second overhang portions of said retaining ring when said retaining ring is received in said first retaining groove.

15. A fitting assembly according to claim 1, said retaining ring being made from a stiffly flexible material.

16. A fitting assembly according to claim 1, at least one of said male fitting and said female fitting being molded into a tank or vessel, forming an integral part thereof.

17. A fitting assembly according to claim 1, at least one of said male and female fittings being threaded such that it is threadably connectable to a fixture in a fluid system, said fixture being selected from the group consisting of tanks, vessels, pipes, and operational units.

18. A fitting assembly according to claim 1, said female fitting further comprising a metal rim portion, said second retaining groove provided in said metal rim portion.

19. A fitting assembly according to claim 18, said metal rim portion being provided as an integral part of a fixture selected from the group consisting of tanks, vessels, pipes, and operational units.

20. A fitting assembly according to claim 11, said fixture being a fluid vessel, said metal rim portion being fixed to said fluid vessel by blow molding or rotational molding said vessel around said metal rim portion such that said metal rim portion becomes an integral part of said molded vessel.

21. A fitting assembly according to claim 20, said vessel being resin coated or filament wound or both.

22. A fitting assembly according to claim 19, said metal rim portion having a retentive shaped groove therein adapted to physically retain plastic material from said molded vessel that is pressed in said retentive shaped groove during a molding process.

23. A fitting assembly according to claim 19, an outer wall of said vessel being molded around and over an outer circumferential rim of said metal rim portion thereby securely constraining said metal rim portion in place as an integral part of said vessel.

24. A fitting assembly according to claim 18, said retaining ring being made from metal, a portion of said throat wall being a metal surface provided by said metal rim portion, a further portion of said throat wall being a plastic surface, said sealing groove and said plastic surface being arranged such that, when said male fitting is received in said female fitting, said O-ring is radially compressed against said plastic portion of said throat wall to provide said water tight seal.

* * * * *